US007148590B1

(12) United States Patent
Lampson

(10) Patent No.: US 7,148,590 B1
(45) Date of Patent: Dec. 12, 2006

(54) POLYPHASE SAWYER MOTOR FORCER

(76) Inventor: Clark E. Lampson, 54738 Day Rd., Milton-Freewater, OR (US) 97862

( * ) Notice: Subject to any disclaimer, the term of this patent is extended or adjusted under 35 U.S.C. 154(b) by 0 days.

(21) Appl. No.: 11/182,631

(22) Filed: Jul. 14, 2005

Related U.S. Application Data

(60) Provisional application No. 60/590,711, filed on Jul. 23, 2004.

(51) Int. Cl.
*H20K 41/00* (2006.01)
(52) U.S. Cl. ............... 310/12; 310/15; 310/17; 310/27; 310/23; 310/32
(58) Field of Classification Search .......... 310/12, 310/15, 17, 23, 27, 32
See application file for complete search history.

(56) References Cited

U.S. PATENT DOCUMENTS

| | | | |
|---|---|---|---|
| 3,376,578 A | | 4/1968 | Sawyer |
| 3,457,482 A | | 7/1969 | Sawyer |
| 3,729,746 A | * | 5/1973 | Humphrey ............... 2/9 |
| 3,824,420 A | * | 7/1974 | Stegeman et al. ......... 310/80 |
| 3,836,835 A | | 9/1974 | Sawyer |
| 3,878,411 A | | 4/1975 | Nocito |
| 4,439,702 A | * | 3/1984 | Belikov et al. ........... 310/80 |
| 4,868,431 A | * | 9/1989 | Karita et al. ............. 310/12 |
| 4,912,746 A | * | 3/1990 | Oishi ..................... 310/12 |
| 5,742,136 A | | 4/1998 | Ono |
| 5,910,691 A | * | 6/1999 | Wavre .................... 310/12 |
| 6,522,035 B1 | | 2/2003 | Smit |

FOREIGN PATENT DOCUMENTS

JP  9261944  10/1997

OTHER PUBLICATIONS

Theory and Application of Step Motors, B. C. Kuo, Ch 6 Permeance Model and Reluctance Force Force Between Toothed Structures H. D. Chai.
Step Motors and Control Systems, B.C. Kou, pp. 38, 40 & 41.
Proceedings Thirteenth Annual Symposium Incremental Motion Control Systems and Devices, B.C Kao. Linear Stepping Motor with Uncoupled Phases, J.P. Pawletko & N. D. Chai.
Proceedings of the Seventh International Motor-con '85 Conf, Direct Linear and Cartesian Coordinate Stepping Motors, E.R. Pelta.
Hybrid Linear Stepper Motors, I. A. Viorel. & L. Szabo pp. 4-8.

* cited by examiner

*Primary Examiner*—Darren Schuberg
*Assistant Examiner*—Iraj A. Mohandesi

(57) ABSTRACT

An improved hybrid variable reluctance linear forcer design of the type known as a Sawyer motor forcer is provided with a 6-phase magnetic design. The 6-phase magnetic design has reduced force ripple compared to existing 2/4-phase and 3-phase designs providing smoother motion with lower velocity ripple. Three identical electromagnets each having four salient toothed poles with each pole being spaced at a unique 30 degree phase increment form a 12-pulse force function equivalent to a 6-phase motor. The electromagnets are provided with split-phase windings, which enable balanced 3-phase amplifiers to drive 6-phase coils.

8 Claims, 10 Drawing Sheets

POLYPHASE SAWYER MOTOR FORCER

CROSS-REFERENCE TO RELATED APPLICATIONS

Figure 1:
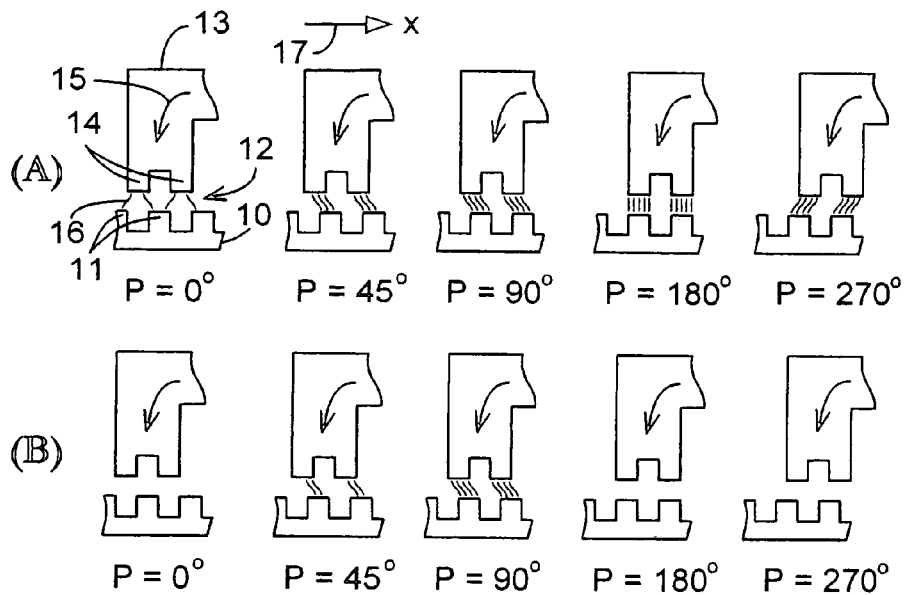

This application claims the benefit of PPA Ser. Nr. 60/590,711, filed Jul. 23, 2004.

FEDERALLY SPONSORED RESEARCH

None.

SEQUENCE LISTING

None.

BACKGROUND

This invention relates to linear motors forcers. Well known in the art are linear motor systems of the type known as Sawyer motors after the original inventor Bruce Sawyer. These systems consist of a flat strip or sheet of magnetic material, such as electrical grade steel, with periodic grooves cut or etched in the surface forming teeth, and an opposed mechanism with toothed electromagnetic elements. The steel strip or sheet is referred to as a platen, while the electromagnetic mechanism is referred to as a forcer.

If the Sawyer motor operates in only one direction, it is a linear motor. The platen in this case is a strip with teeth cut in a direction orthogonal to the direction of motion. The forcer for a linear motor may contain only a single set of electromagnets, although multiple sets may be used to increase force. If the Sawyer motor operates in two directions it is a planar motor. The platen in this case is a sheet with teeth cut in two orthogonal directions forming a grid of intersecting grooves. The forcer for a planar motor must contain at least two electromagnets, one for each axis of motion, although more electromagnets are typically used. More specialized versions of both linear and planar Sawyer motors exist which use curved electromagnets and curved or cylindrical platens. Such designs can provide linear as well as rotational motion from a single motor.

The grooves formed in both the platen surface and the forcer electromagnets, are typically filled with a strong, stable epoxy, and both the platen surface and the toothed forcer surface are ground and lapped to provide an air-bearing quality surface. The forcer is provided with a flexible cable assembly, termed an umbilical, which contains the motor coil leads and a compressed air supply tube. Passages in the forcer mechanism convey the compressed air supplied by the tube to an arraignment of small orifices or air jets, releasing the air into a thin gap which forms between the forcer and the platen in opposition to the strong magnetic attraction between these two members. Planar Sawyer motors almost universally utilize air-bearings. Linear Sawyer motors may utilize air-bearings, ball or roller bearings, or recirculating ball slide units.

It is a characteristic of Sawyer motors that the electromagnetic mechanism contains all permanent magnets and all coil windings, while the platen is fundamentally a passive magnetic element. Numerous other linear and planer motor designs exist wherein the platen may contain permanent magnets or coil windings. These are usually referred to as brushless linear motors, moving coil motors, or AC linear motors.

This invention relates specifically to the design of hybrid variable reluctance electromagnets used in linear motor forcers and is not concerned with the details of linear motor platens. A linear motor or planar motor consists of the combination of both a forcer and a platen. The remainder of this disclosure will use the term forcer in referring to the invention when not specifically discussing a forcer and a platen.

Numerous patents and technical publications have disclosed the prior art in this field. U.S. Pat. No. 3,376,578 to Sawyer described various 3-phase variable reluctance magnetic structures for forcers. This patent also disclosed the general equation for spacing single-phase elements to form a poly-phase forcer. U.S. Pat. No. 3,457,482 to Sawyer subsequently disclosed a hybrid variable reluctance design that incorporated permanent magnets. This design used two identical single-phase electromagnets to form a functional forcer. Next Bruce Sawyer disclosed (U.S. Pat. No. 3,836,835) an additional hybrid linear forcer design wherein one permanent magnet and two coils form a functional forcer, the most compact design to date.

Nocito, et al. (U.S. Pat. No. 3,878,411) disclosed an improved linear motor design based on four of the previously disclosed single-phase hybrid variable reluctance elements. This design spaced the hybrid variable reluctance elements in an optimal manner to form a linear motor capable of higher intrinsic positioning accuracy. This design is known as the 2/4-phase motor design since although four single-phase elements are used in each linear motor, the elements typically use coil windings coupled in a particular manner to allow 2-phase drive.

These early patent disclosures typically show large U-shaped permanent magnets coupling the back of two iron cores. This design was common when low-energy product ferrite or alnico magnets were used. With the advent of high-energy product rare earth magnets, a much smaller magnetic volume is required, and it is usually placed between the iron cores. The two designs are sometimes referred to as exterior or back structure vs. interior or sandwich permanent magnet designs. The book *Theory and Application of Stem Motors* (B. C. Kuo 1974) and *Incremental Motion Control Step Motors and Control Systems* (B. C. Kuo 1979) and the paper *Direct Linear and Cartesian Coordinate Stepping Motors* (Ed Pelta, 1985) provide a good technical description of these magnetic designs.

U.S. Pat. No. 6,533,035 to Smith disclosed a design wherein three of the well known single-phase hybrid variable reluctance elements are spaced apart to form a 3-phase linear motor. U.S. Pat. No. 5,742,136 to Ono et al., disclosed a magnetically coupled 3-phase linear motor. Japanese Pat. JP9261944 to Sutoki Riyuutarou disclosed a modified hybrid variable reluctance design wherein one permanent magnet and six coils from a 3-phase linear motor.

To more fully understand the current invention a detailed description of pertinent aspects of prior art is required. It should be noted that most descriptions of Sawyer motor operation approach the subject from an open-loop perspective, assuming the motors are operated as open-loop synchronous machines. As such, the drawings and discussion focus on tooth alignment and natural detent positions. In the discussion that follows the perspective is that of closed-loop control which focuses on force production. Useful force is produced in electromagnet systems when space quadrature of the magnetic fields (M and H vectors) exists. Useful motion occurs when the magnetic fields translate or rotate with time. This leads to the well-known requirements of "space quadrature and time phase" for useful electromechanical energy conversion.

DESCRIPTION OF PRIOR ART—FIGS. 1, 2, 3, 4, 5A, 5B, 6, 7, 8

FIG. 1 shows a partial view of a magnetic system in ten different states. A magnetic core 13 is provided with one or more teeth 14 and is spaced apart by a small gap 12 from a second magnetic element 10 provided with a plurality of teeth 11. Magnetic element 10 is termed a platen. Core 13 is under the influence of an externally generated magnetomotive force (mmf) as shown by the arrow 15. Magnetic flux produced by mmf 15 descends through core 13, emerges from teeth 14, crosses gap 12 as denoted by wavy lines 16 and enters teeth 11 of platen 10. Not shown is a necessary return magnetic path to complete the circuit. In FIG. 1(A), core 13 is shown at five different relative positions to platen 10. A direction of motion is indicated by arrow 17. Position is denoted in terms of phase where 360 degrees equates to moving a distance equal to one tooth pitch.

In the position of 0 degrees, teeth 14 of core 13 are 180 degrees out of alignment with teeth 11 of platen 10 resulting in high magnetic reluctance and hence low magnetic flux. The flux bridges symmetrically left and right from teeth 14 to teeth 11. With core 13 displaced to 45 degrees, a directional bias to the right is evident in the flux path from teeth 14 to teeth 11. The flux density also increases due to less reluctance as the teeth become more aligned. The process continues as shown at 90 degrees and finally at 180 degrees where teeth 14 and teeth 11 are fully aligned. At 180 degrees, the flux density is at a maximum, while reluctance is at a minimum. With a further displacement to 270 degrees, it is seen that the flux exits teeth 14 with a bias to the left while traversing gap 12 to teeth 11. Flux density is decreasing and reluctance is increasing for this position relative to the values at 180 degrees.

If mmf 15 is held constant independent of position of core 13 relative to platen 10, the varying reluctance of the toothed magnetic circuit will result in varying magnetic energy stored in gap 12. The negative derivative of gap energy storage vs. displacement is the lateral force produced between core 13 and platen 10.

Figure 2:
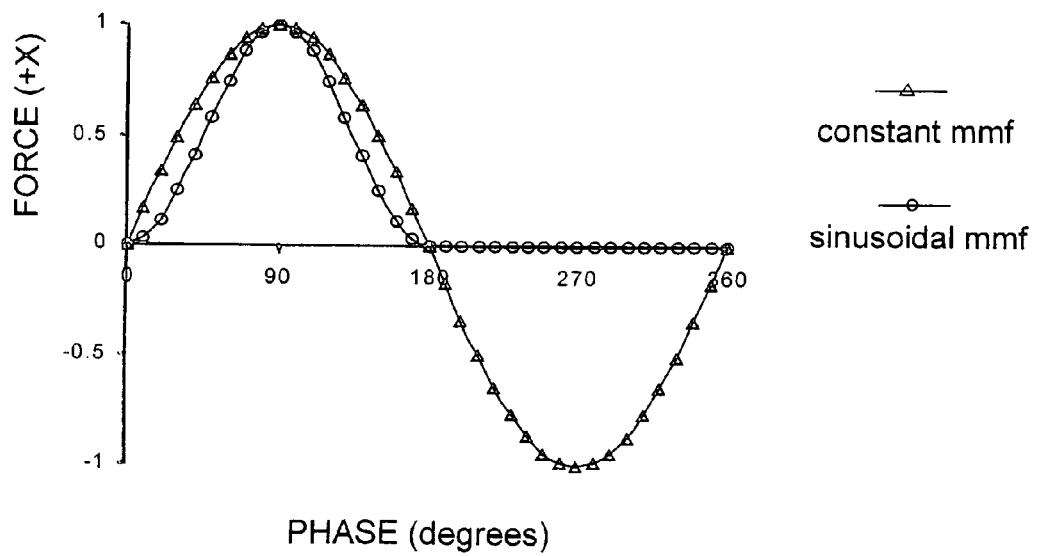

FIG. 2 shows force vs. displacement for two cases of mmf generation, constant and sinusoidal. For constant mmf excitation, force is a sinusoidal function of position. Positive force in the +x direction is only produced over the interval from 0 to 180 degrees. From 180 to 360 degrees, force is produced in the -x direction. Peak force in +x occurs at 90 degrees where teeth 14 and teeth 11 have 50% tooth overlap corresponding to 90 degrees of misalignment. If useful force in the +x direction is desired independent of position, clearly some means of eliminating the negative force produced over the interval from 180 to 360 degrees must be used.

At FIG. 1(B) the same five positions are shown with mmf 15 provided from some "intelligent" source linked to core 13 position. Specifically, let mmf 15 be given by the following equations:

$$mmf = \sin(P) \text{ for } 0 <= P <= 180 \text{ degrees}$$

$$mmf = 0 \text{ for } 180 < P < 360 \text{ degrees}.$$

Since $\sin(0)=0$, there is no flux for the position of 0 degrees. At position 90 degrees, $\sin(90)=1$ resulting in maximum flux. At position 180 degrees, $\sin(180)=0$ and flux is again 0. For all positions from 180 to 360 degrees, flux is 0 since mmf 15 is zero for this region by definition of the controlling equations. FIG. 2 shows a curve for force resulting from sinusoidal mmf. This curve produces positive +x force for the region 0 to 180 degrees only, and no negative force for any region. The shape of this force curve in the region 0–180 degrees is that of a $\sin^2$ function and is always less than the sin curve of constant mmf except for the maximum at 90 degrees where the two curves are equal. In practice, the waveforms shown in FIG. 2 are not perfect functions of sin, due to distortions arising from tooth geometry and magnetic materials properties. Chapter 6 Permeance Model and Reluctance Force Between Toothed Structures by H. D. Chai in the book *Theory and Applications of Step Motors* (B. C. Kuo Ed. 1974) and the paper *Direct Linear and Cartesian Coordinate Stepping Motors* (Ed Pelta, 1985) provide additional details on this subject.

The prior art disclosures for Sawyer motor designs are all based on configuring multiple toothed cores such as core 13 of FIG. 1 with sources of mmf in such a manner that continuos and smooth force in either +x or -x direction may be obtained. It is additionally desired to provide compact mechanisms with high force to weight ratios, high positioning accuracy, good power efficiency while, and low manufacturing cost. As may be expected, it is difficult to achieve all of these goals in a single design.

Figure 3:
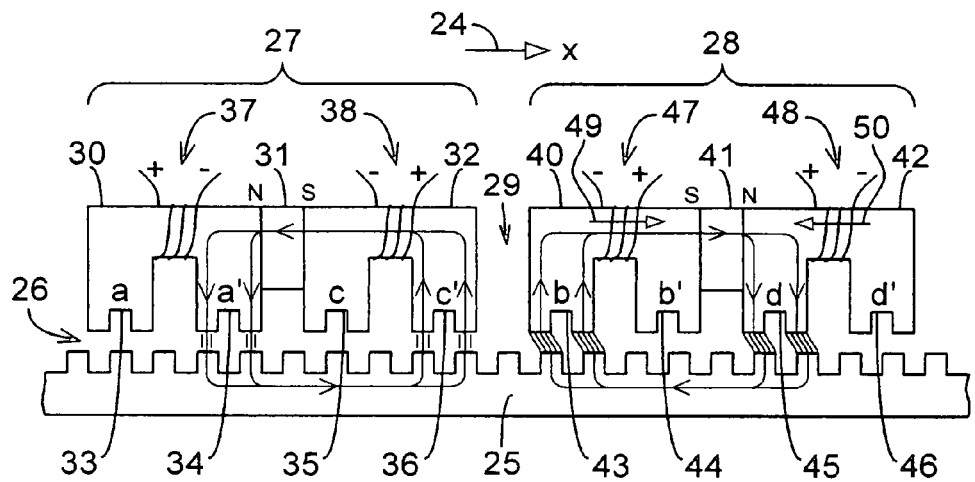

FIG. 3 shows a detailed view of a 2-phase Sawyer motor (U.S. Pat. No. 3,457,482). A toothed platen 25 is spaced apart by an air gap 26 from a pair of similar electromagnets 27 and 28. Electromagnet 27 is provided with a first U-shaped magnetic core 30 spaced apart from a second U-shaped magnetic core 32 by a rectangular permanent magnet 31. Core 30 has a first toothed pole 33 spaced apart from a second toothed pole 34 with a wire winding 37 disposed on core 30 between poles 33 and 34. Core 32 has a first toothed pole 35 spaced apart from a second toothed pole 36 with a wire winding 38 disposed on core 32 between poles 35 and 36. Electromagnet 28 is provided with a first U-shaped magnetic core 40 spaced apart from a second U-shaped magnetic core 42 by a rectangular permanent magnet 41. Core 40 has a first toothed pole 43 spaced apart from a second toothed pole 44 with a wire winding 47 disposed on core 40 between poles 43 and 44. Core 42 has a first toothed pole 45 spaced apart from a second toothed pole 46 with a wire winding 48 disposed on core 42 between poles 45 and 46. A gap 29 separates electromagnet 27 from electromagnet 28.

The toothed poles 33, 34, 35, 36, 43, 44, 45, and 46 are spaced apart from each other in a precise manner relative to the teeth of platen 25 with the teeth of each one of the respective poles having a relative phase offset. With the position shown being defined as an arbitrary zero, the relative phases may be assigned as follows:

Pole 33: offset 0 degrees, phase labeled a.
Pole 34: offset 180 degrees, phase labeled a'.
Pole 35: offset 0 degrees, phase labeled c.
Pole 36: offset 180 degrees, phase labeled c'.
Pole 43: offset 90 degrees, phase labeled b.
Pole 44: offset 270 degrees, phase labeled b'.
Pole 45: offset 90 degrees, phase labeled d.
Pole 46: offset 270 degrees, phase labeled d'.

Each of the poles 33, 34, 35, 36, 43, 44, 45, and 46 of FIG. 3 are seen to be similar to core 13 of FIG. 1. If some means of inducing a sinusoidal mmf in these cores can be effected, each will produce a $\sin^2$ type force function over a 180-degree range as was seen in FIG. 2. For the position shown, with the intent of inducing motion in the +x-direction the function of electromagnet 28 will be considered first.

Permanent magnet 41 provides a mmf, which biases core 42 to a magnetic N potential and biases core 40 to a magnetic S potential. If this were the only source of mmf in electromagnet 28, flux would distribute in poles 43, 44, 45, and 46 according to the reluctance in air gap 26 between toothed poles 43, 44, 45, and 46 and toothed-platen 25. If a constant mmf were applied to pole 46 a sinusoidal force vs. position function would result as shown in FIG. 2. If a constant mmf were applied to pole 45 a sinusoidal force vs. position function would result as well. However, the sinusoidal force function for pole 46 would be 180 degrees out of phase relative to the sinusoidal force function for pole 45 thus exactly canceling each other out. In the same way, pole 43 is displaced 180 degrees from pole 44, hence the combined pole pairs under constant mmf cannot produce any net force.

The addition of winding 48 on core 42 and winding 47 on core 40 provides a means of controllable altering the mmf seen by each of the poles 43, 44, 45, and 46. If current is caused to flow into the +terminal of winding 48, then a mmf vector 50 is produced which decreases flux in pole 46 but increases flux in pole 45. Similarly, if current is caused to flow into the + terminal of winding 47, then a mmf vector 49 is produced which decreases flux in pole 44 but increases flux in pole 43. Windings 47 and 48 are actually in phase, and may be connected in either series or parallel and treated as a single phase. In fact, windings 47 and 48 are often formed using a single winding disposed in the slot between poles 43 and 44 to the slot between poles 45 and 46. If windings 47 and 48 are driven by a current which is sinusoidal with respect to the position of electromagnet 28 relative to platen 25, then the mmf seen by poles 43, 44, 45, and 46 is similar to the case shown in FIG. 1(B) for sinusoidal mmf excitation of a single core. Poles 33, 34, 35, and 36 and windings 37 and 38 of electromagnet 27 function in a similar manner.

Figure 4:
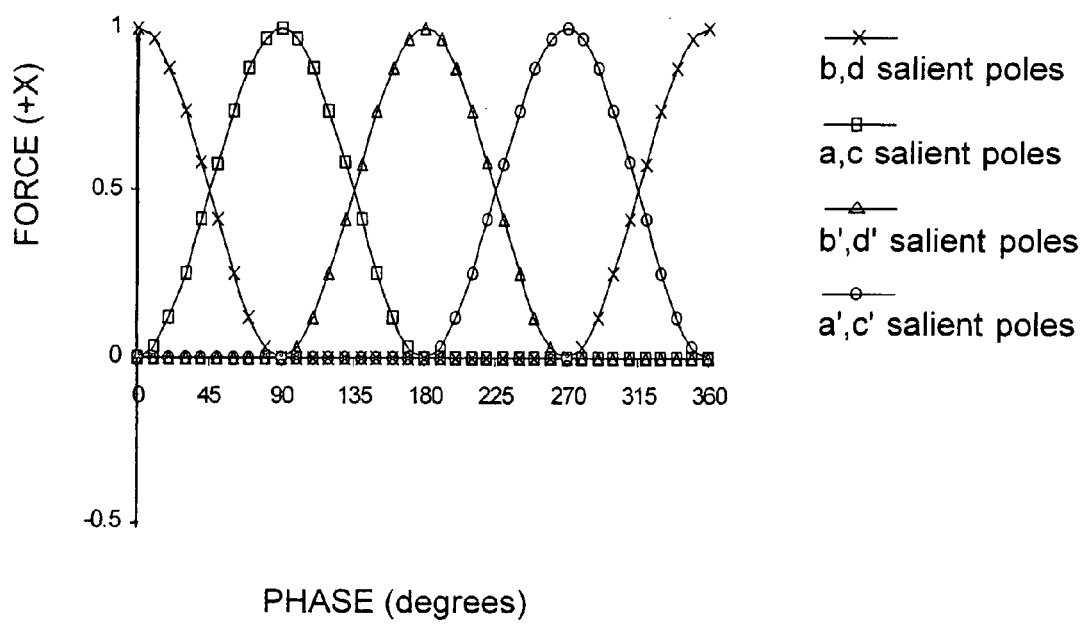

FIG. 4 shows the net force produced by electromagnets 27 and 28 assuming appropriately phased sinusoidal currents are commanded to windings 37, 38, 47, and 48 based on the relative phase position of electromagnets 27 and 28 to platen 25. For the starting position shown, and for motion in the +x-direction as shown by an arrow 24, windings 47 and 48 would require a cosine current function (cos(0)=1) while windings 37 and 38 would require a sine function (sin(0)=0). Poles 43 and 45 are in phase and produce identical force functions. Similarly, poles 44 and 46 are paired, poles 33 and 35 are paired, and poles 34 and 36 are paired. Each in phase pole pair produces a phased $\sin^2$ type force function over some 180-degree interval, and is 0 for the remaining 180 degrees of each 360-degree tooth pitch. The sum of two such functions that are 180 degrees apart is in fact some phased $\sin^2$ over the entire 360 degrees. Thus the force function of poles 43 and 45 summed with the force function of poles 44 and 46 is $\cos^2$, while the force function of poles 33 and 35 summed with the force function of poles 34 and 36 is $\sin^2$. Since $\sin^2+\cos^2=1$, it can be seen that the design shown in FIG. 3 is capable of producing constant force independent of position. It should be noted that a more detailed examination of force produced by each pole would show some negative and positive forces produced during the 180-degree interval that is assumed to be zero force in FIG. 4. These additional forces when summed over all the poles of each electromagnet cancel out reasonable well, leaving the net forces shown in FIG. 4.

The design shown in FIG. 3 is the now classic 2-phase Sawyer motor design. Some important aspects of this design will be qualitatively noted. This design is one example of a class of electrical machines referred to as homopolar synchronous machines. Further it is a double salient permanent magnet machine (DSPM). Referring to electromagnet 28, core 40 has two discrete or salient poles, 43 and 44, while core 42 has two discrete or salient poles, 45 and 46. Permanent magnet 41 always biases core 42 and salient poles 45 and 46 to N potential while core 40 and salient poles 43 and 44 are biased to S potential. Hence electromagnet 28 is homopolar, that is the magnetic field never reverses. The function of winding 47 is to differentially steer flux through salient poles 43 and 44 while winding 48 provides the same function with respect to salient poles 45 and 46. Flux always emerges from poles 45 and 46, crosses gap 26, flows along platen 25, crosses gap 26 and enters poles 43 and 44. The mmf produced in windings 47 and 48 is restricted to a range that never reverses this flux flow. The machine is synchronous in that force production depends on winding current being controlled as a function of the position of electromagnets 27 and 28 relative to platen 25. This control may be open-loop or closed-loop depending on whether some means of actually sensing the position is used.

Electromagnets 27 and 28 are each considered single-phase elements despite having four salient poles each. As previously noted, in phase pole pairs produce in phase force functions, hence each electromagnet has only two distinct magnet poles. Further, each pole pair can only attract to platen 25, there is no mechanism for repulsion in this design. This is a consequence of platen 25 being magnetically passive as is typical of strictly variable reluctance elements. Any pole that is +/−180 degrees out of phase to another pole is part of the same electrical phase.

The design of FIG. 3 shows permanent magnet 31 placed between cores 30 and 32, and permanent magnet 41 placed between cores 40 and 42. This is the so-called interior or sandwich magnetic design. Rare earth magnets such as samarium-cobalt are used for this purpose. Since the permeability of rare earth magnets is close to unity, the magnet functions as a large air gap in the circuit in addition to providing a bias mmf. This isolates the mmf effects of coil 38 from coil 37 and coil 48 from coil 47. Examining electromagnet 28, the flux through magnet 41 remains constant at all times independent of the position of electromagnet 28 relative to platen 25 or the operating conditions of windings 47 and 48. The net flux flowing through platen 25 directly adjacent to magnet 41 is also constant. However, the position of electromagnet 28 relative to platen 25 in conjunction with mmf induced by windings 47 and 48 causes variation in the flux path of the magnetic circuit. For the state shown in FIG. 3, flux is shown circulating down pole 45, through platen 25, returning up pole 43 and across magnet 41. When electromagnet 28 shifts 180 degrees in the +x-direction, flux will circulate down pole 46, through platen 25, up pole 44, and across magnet 41. It can thus be seen that the magnet flux path effectively oscillates back and forth relative to the central location of magnet 41 in electromagnet 28 depending on instantaneous operating conditions.

A very significant aspect of this single-phase electromagnet design should be noted. Pole 43 of core 40 is further from magnet 41 than pole 44. It is in phase with pole 45 of core 42 that is closer to magnet 41 than pole 46. Thus it is seen that in phase pole pair 43 and 45 has both a close and more distant location to magnet 41, while the same is also true of in phase pole pair 44 and 46. There are three consequences of this arrangement. First, the effective flux path length stays approximately constant independent of operating condition, however it does oscillate back and forth spatially as noted above. Secondly, poles 44 and 45 which are adjacent to magnet 41 but of opposite magnetic polarity are 180 degrees out of phase. This allows windings 47 and 48 to be formed as a single winding from the slot between poles 43 and 44 to the slot between poles 45 and 46. Such a winding encloses poles 44 and 45 and part of magnet 41. The third consequence of this arrangement is improved linearity in the magnetic circuit. Since pole 44 is closer to magnet 41 than pole 43, magnetic reluctance is less for pole 44 than pole 43. However, the reverse is true for the respective phase poles 46 and 45 on the opposite side of magnet 41. Thus each in phase pole pair such as 43 and 45 has one higher reluctance member such as 43 and one lower reluctance member such as 45 in the magnetic path reluctance. Designs, which do not balance magnetic path length and magnetic path reluctance, are to be avoided.

It should be further noted that the orientation of permanent magnets 31 and 41 are in opposition to each other. The purpose of alternating orientation is to effectively isolate the magnetic circuit of electromagnet 27 from the magnetic circuit of electromagnet 28. Although this was disclosed in the drawings of Bruce Sawyer's patents, a better technical description can be found in the paper *Linear Stepping Motor with Uncoupled Phases* by J. P. Pawletko and H. D. Chai (1984). This paper describes a 3-phase variable reluctance design, but the principle is identical to reverse biased permanent magnet designs.

As previously noted, an alternate position of permanent magnets known as exterior, outer, or back-surface designs also exists. Many winding variations have also been disclosed. The original patent to Sawyer (U.S. Pat. No. 3,457,482) illustrates some of these alternatives.

Figure 5A:
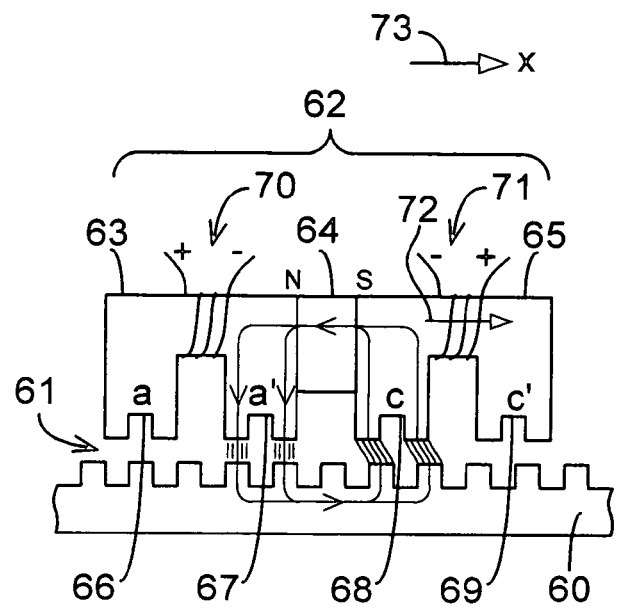

FIG. 5A illustrates an improvement (U.S. Pat. No. 3,836,835) based on the single-phase electromagnet design of FIG. 3. A platen 60 is spaced apart by an air gap 61 from an electromagnet 62. Electromagnet 62 consists of a first magnetic core 63 having a pair of toothed poles 66 and 67 spaced apart by a permanent magnet 64 from a second magnetic core 65 having a pair of toothed poles 68 and 69. A winding 70 is provided between poles 66 and 67 of core 63 while a winding 71 is provided between poles 68 and 69 of core 65. The elements of electromagnet 62 of FIG. 5A are mechanically and functionally similar to the elements of electromagnets 27 or 28 of FIG. 3. The one important difference is the relative phase spacing of poles 66, 67, 68, and 69. If pole 66 is defined as being at 0 degrees, then pole 67 is at 180 degrees, while pole 68 is at 90 degrees and pole 69 is at 270 degrees. Thus it can be seen that poles 66 and 67 on one side of magnet 64 have a relationship of 180 degrees to each other, and similarly poles 68 and 69 on the opposite side of magnet 64 also have a relationship of 180 degrees to each other. This is as the conditions in FIG. 3 except for the fact that matching phase pole pairs across magnet 64 do not exist.

Magnet 64 provides a net bias mmf between cores 63 and 65 while windings 70 and 71 provide steering mmf to controllable direct flux through the desired poles 66, 67, 68 and 69 depending on the position of electromagnet 62 relative to platen 60 and the desired direction of force generation. FIG. 5A shows the operating condition for maximum force generation in the +x-direction, as shown by an arrow 73, with pole 68 being in the 90-degree misalignment state generating maximum force. For this state, winding 71 is energized ($\cos(0)=1$) to produce a mmf vector 72 which increases flux in pole 68 while canceling flux in pole 69. At the same instant winding 70 is not energized ($\sin(0)=0$) and flux is free to find the path of least reluctance through either pole 66 or 67 which in this instance is pole 67.

A plot of net force produced from the design shown in FIG. 5A would be similar to the plot of FIG. 4, but would have one half the amplitude. This is a result of electromagnet 62 of FIG. 5A having one-half the active pole area of combined electromagnets 27 and 28 of FIG. 3. The significance of this design is that a single electromagnet such as 62 can produce position independent force (i.e. it is useful motor) when equipped with two windings and four poles having the phase relationship described above. For the same geometrical size of electromagnets this enables a motor approximately one-half the size of that obtainable with the design of FIG. 3 with corresponding one-half force.

Figure 5B:
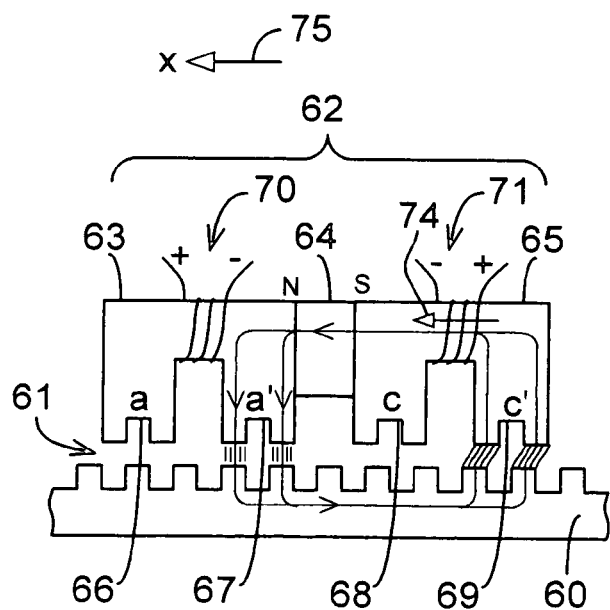

FIG. 5B shows the design of FIG. 5A in the same relative position but with winding 71 energized to produce a mmf vector 74 for generating force in the opposite direction as shown by an arrow 75. Flux is concentrated through pole 69, which is the force-producing pole, and again returns via aligned pole 67. A comparison of flux paths between FIG. 5A and FIG. 5B illustrates that operating condition changes result in variable magnetic flux path lengths. In addition, poles 66 and 69 are further from magnet 64 than poles 67 and 68. Since each of poles 66, 67, 68 and 69 have unique phase, there are nonsymmetrical magnetic paths from magnet 64 to each individual phase. As a result, the single element two-phase electromagnet design of FIGS. 5A and 5B is less linear than the two-element single-phase electromagnet design of FIG. 3. Finally it should be noted that if the electromagnets are comparably sized, and the desired motor force equal, than two similar elements as shown in FIG. 5 must be used in parallel to obtain the same force as the design of FIG. 3, hence there is no cost advantage either.

Figure 6:
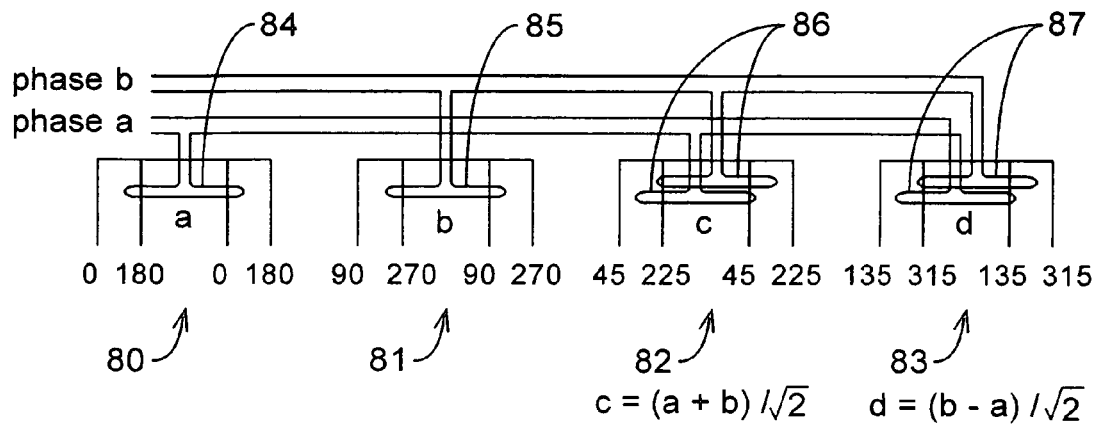

FIG. 6 illustrates the next major improvement in Sawyer motor design as disclosed by Nocito, et al. in U.S. Pat. No. 3,878,411. In the discussion of FIG. 2 and FIG. 4 above, pole force functions were stated to be of a sin type. In reality, it is a distorted $\sin^2$ function with the major distortion being the fourth order harmonic of tooth pitch. This can be conceptually understood by noting that FIG. 4 contains four peaks. If these individual functions are distorted, their sum is no longer a constant but will contain a 4'th order distortion. Another way to understand this is that $\sin^2 t = \frac{1}{2}(\sin 2t+1)$ so that the 1'st harmonic of the force function is the 4'th harmonic of the tooth pitch. This force function distortion effects positioning accuracy in open-loop systems and produces non-linear force ripple in close-loop systems. In open-loop systems it can lead to significant resonant behavior when motors slew at velocities where the force distortion frequency matches the mechanical resonant frequency of the motor. Even in closed-loop systems, suppression of this resonant behavior may be an issue.

The solution proposed by Nocito was to double the number of single-phase electromagnets and space them in a manner that caused the 4'th order distortion to cancel. FIG. 6 schematically shows four single-phase electromagnets of the type shown in FIG. 3. A first electromagnet 80 provides poles at 0 and 180 degrees. A second electromagnet 81 is spaced apart to provide poles at 90 and 270 degrees. A third electromagnet 83 is spaced apart to provide poles at 45 and 225 degrees. A fourth electromagnet 83 is spaced apart to provide poles at 135 and 315 degrees.

Electromagnet 80 is provided with a single-phase coil 84 that is connected to phase a. Electromagnet 81 is provided with a single-phase coil 85 that is connected to phase b. Electromagnet 82 is provided with a split-phase coil that is derived from both phase a and phase b as shown. Electromagnet 83 is provided with a split-phase coil that is derived from both phase a and phase b as shown. A plot of pole force functions for the design of FIG. 6 would contain eight peaks spaced 45 degrees apart rather than four peaks spaced 90 degrees apart as for the design of FIG. 3. Unfortunately the design of FIG. 6 doubles the number of electromagnets needed to build a motor, increasing motor size and cost.

Figure 7:
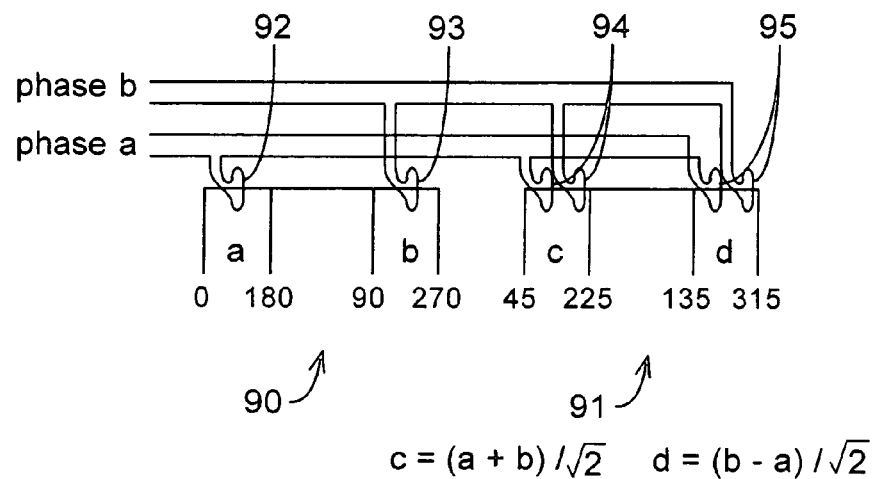

Although Nocito did not disclose it, the same approach can be applied to the single-element, two-phase electromagnet of FIGS. 5A and 5B. FIG. 7 shows a schematic representation of such a design. A first electromagnet 90 is equipped with poles at 0, 180, 90 and 270 degrees while a second similar electromagnet 91 is spaced apart to provide poles at 45, 225, 135 and 315 degrees. Electromagnet 90 is provided with two single-phase windings 92 and 93 connected to phase a and phase b respectively. Electromagnet 91 is provided with two split-phase windings 94 and 95 both of which are connected to both phase a and phase b.

Both of the designs shown in FIG. 6 and FIG. 7 are of the type known as 2/4-phase motors. They are driven as two-phase systems due to the coupled windings on the second set of electromagnets. They produce force impulses according to a true balanced 4-phase configuration. Magnetically the design of FIG. 6 is more linear as previously noted, whereas the design of FIG. 8 allows more compact motors. A disadvantage of both designs shown in FIG. 6 and FIG. 7 are that two different electromagnet winding configurations are required for constructing a motor. This complicates manufacturing somewhat and increases manufacturing cost.

Figure 8:
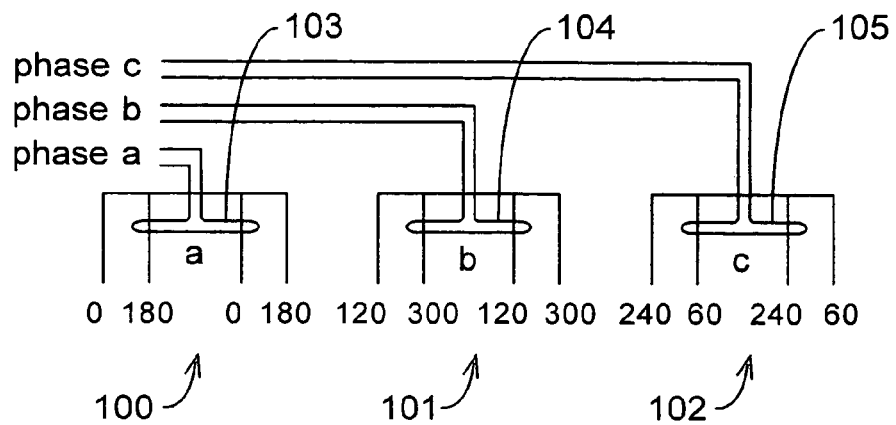

FIG. 8 shows a schematic representation of a 3-phase design disclosed by Smit in U.S. Pat. No. 6,533,035, wherein three of the single-phase elements of FIG. 3 are spaced apart in the well-known 0, 120, 240 degree balanced offsets of 3-phase systems. A first electromagnet 100 is provided with poles spaced at 0 and 180 degrees. A second electromagnet 101 is spaced apart to provide poles at 120 and 300 degrees. A third electromagnet 102 is spaced apart to provide poles at 240 and 60 degrees. Electromagnet 100 is provided with a coil 103 that is designated phase a. Electromagnet 101 is provided with a coil 104 that is designated phase b. Electromagnet 102 is provided with a coil 105 that is designated phase c. It is customary to further connect the leads of phases a, b, and c in either a delta or Y configuration for driving the coils from a 3-phase power amplifier. The design of FIG. 8 produces a force function with six peaks, falling midway between the four-peak force function of the designs of FIG. 3 and FIG. 5A and the eight peak force functions of the designs of FIG. 6 and FIG. 7. It is also intermediate in size requiring three elements.

The 2/4-phase designs are typically driven from dual H-bridge power amplifiers, which is equivalent to four T-bridge power amplifiers. A delta or Y connected 3-phase design is driven from a triple T-bridge power amplifier. The 3-phase design is therefor more economical to drive than the 2/4-phase designs.

BACKGROUND OF INVENTION—OBJECTS AND ADVANTAGES

Accordingly, several objects and advantages of the present invention are:

(a) to provide an improved Sawyer motor design which improves the linearity of pole force function beyond that obtained with the eight pulse 2/4-phase design;

(b) to provide an improved Sawyer motor design which requires fewer electromagnets than the four single-phase electromagnets used in the 2/4-phase design;

(c) to provide an improved Sawyer motor design which can be efficiently driven from 3-phase power amplifiers as either a delta or Y connected machine;

(d) to provide an improved Sawyer motor design wherein all electromagnets and there associated windings are identical, thus reducing manufacturing costs.

Additional objects and advantages of the invention will become apparent from the following description and drawings.

SUMMARY

The above objects are accomplished by utilizing a new 2-phase electromagnet element with three identical such elements coupled in a manner to provide 6-phase force production while being compatible with 3-phase amplifiers. The pole force function has 12 peaks spaced 30 degrees apart which sum to provide smooth continues force independent of position. A split-phase winding allows the six motor phases to be driven from a standard 3-phase amplifier and also results in identical windings for all three electromagnets. The resulting system has lower force ripple than any existing design, is more compact than the four element 2/4 phase design and is cheaper to drive.

DRAWINGS—FIGURES

Sheet 1:
FIG. 1: Single pole magnetic flux behavior of prior art system.
FIG. 2: Force vs. position curves for single pole prior art system.

Sheet 2:
FIG. 3: Dual electromagnet 2-phase prior art system.
FIG. 4: Force vs. position curves for 2-phase prior art system.

Sheet 3:
FIG. 5A: Single electromagnet 2-phase prior art system.
FIG. 5B: Single electromagnet 2-phase prior art system in reverse force.

Sheet 4:
FIG. 6: Schematic diagram of quad electromagnet 2/4-phase prior art system.
FIG. 7: Schematic diagram of dual electromagnet 2/4-phase prior art system.

Figure 9:
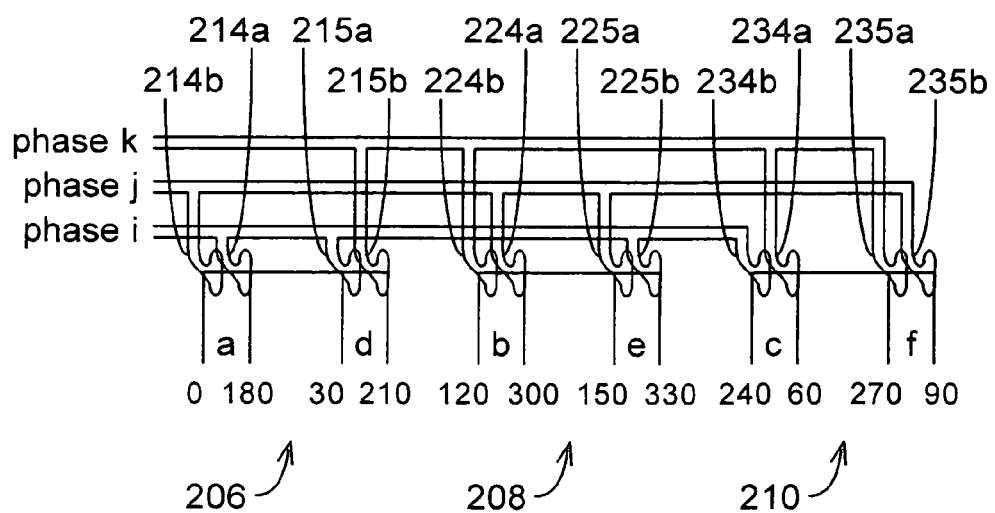

Sheet 5:
FIG. 8: Schematic diagram of triple electromagnet 3-phase prior art system.
FIG. 9: Schematic diagram of triple electromagnet 3/6-phase system.

Figure 10:
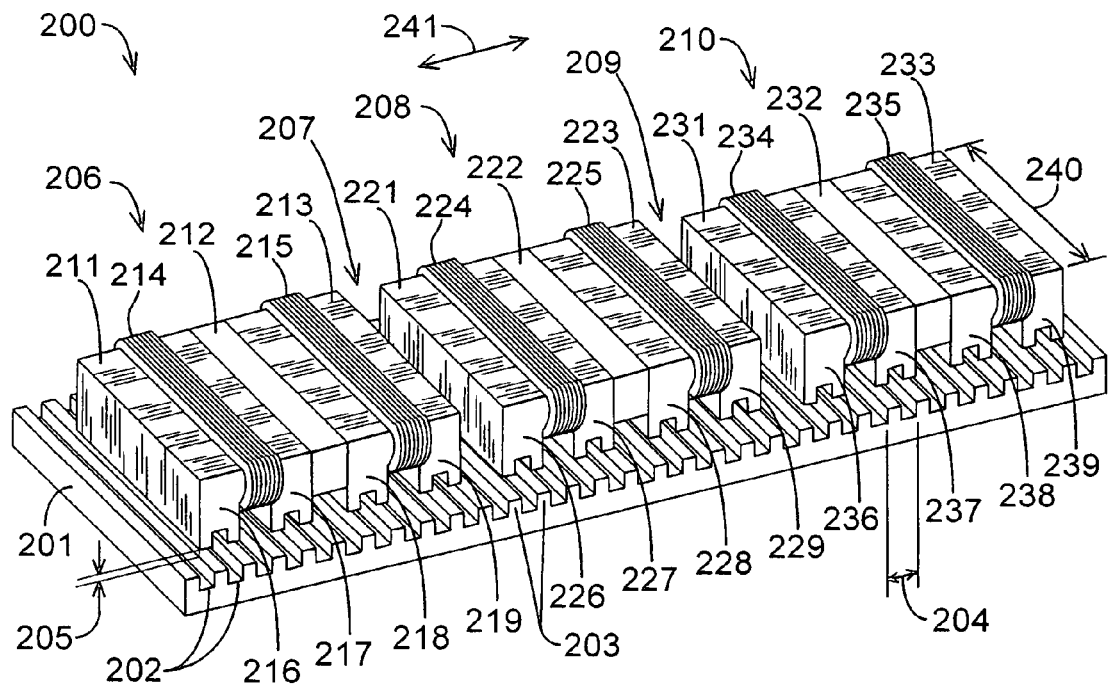
Figure 11:
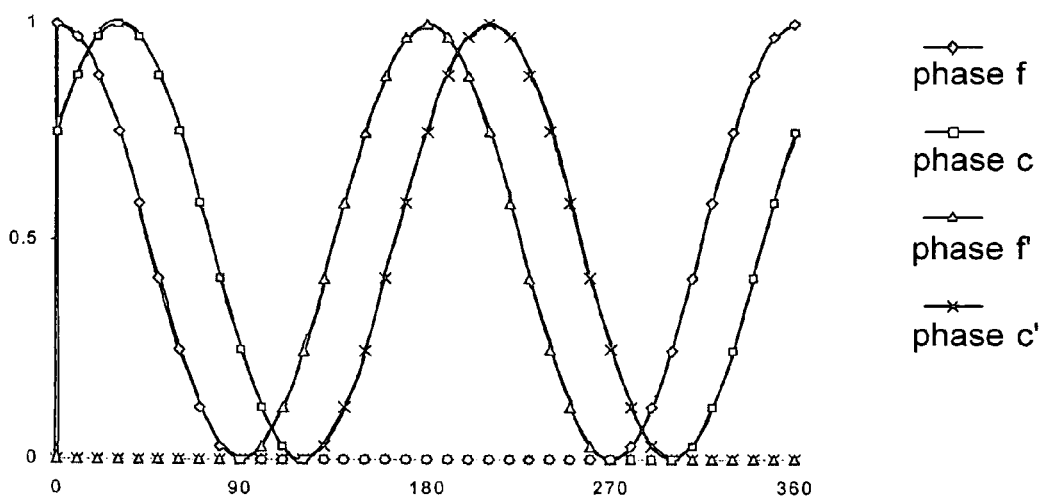

Sheet 6:
FIG. 10: Perspective view of triple electromagnet 3/6-phase system.
FIG. 11: Force vs. position curves for a single electromagnet of the 3/6-phase system.

Figure 12:
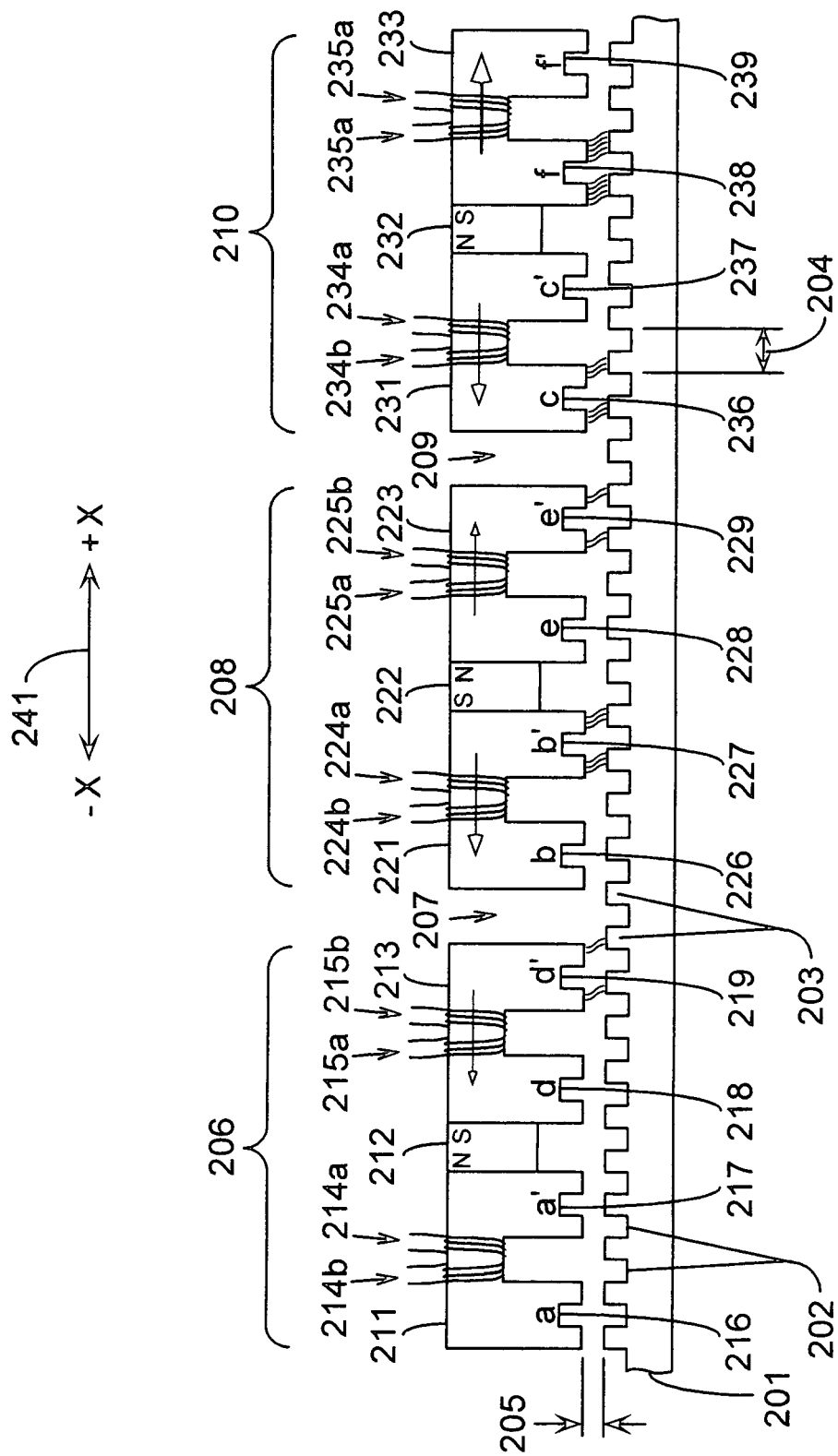

Sheet 7:
FIG. 12: Triple electromagnet 3/6-phase system.

Figure 13:
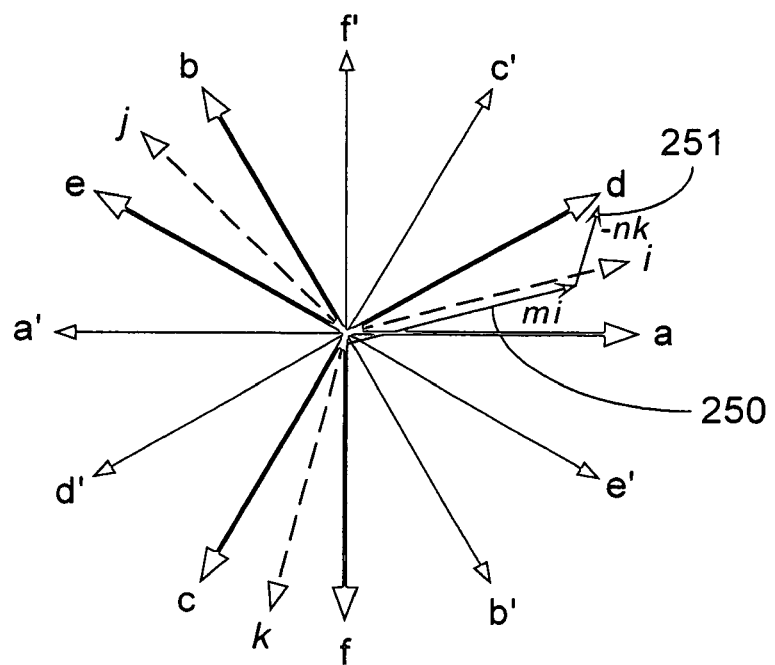
Figure 14:
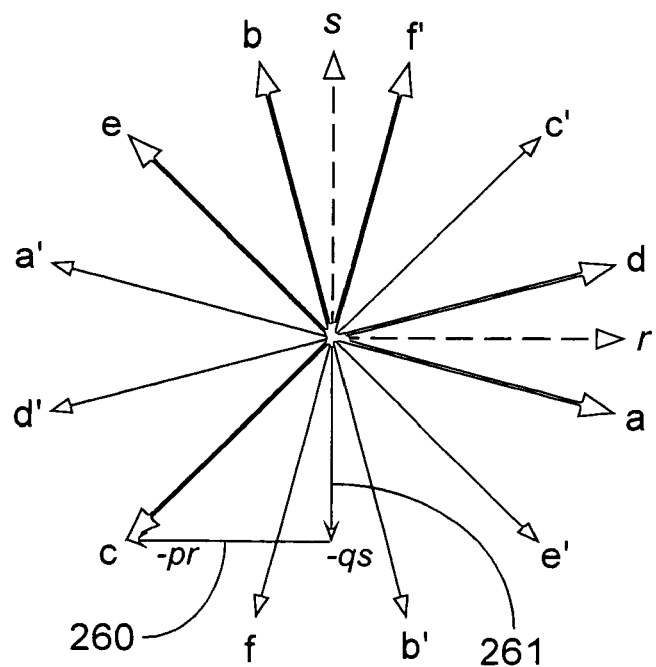

Sheet 8:
FIG. 13: Phase diagram of 3/6-phase system.
FIG. 14: Phase diagram of 2/6-phase system.

Figure 15:
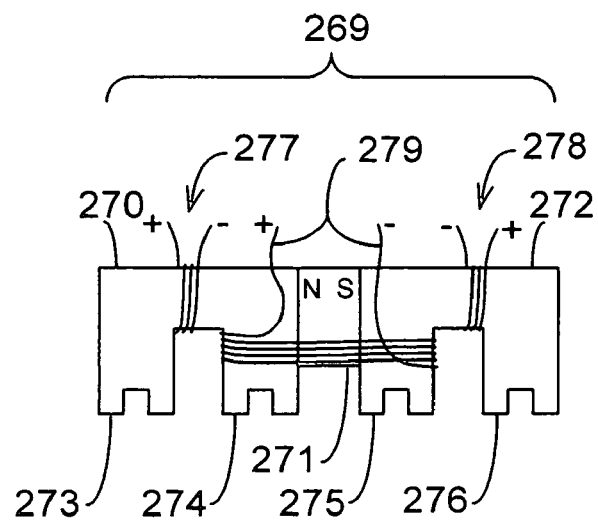
Figure 16:
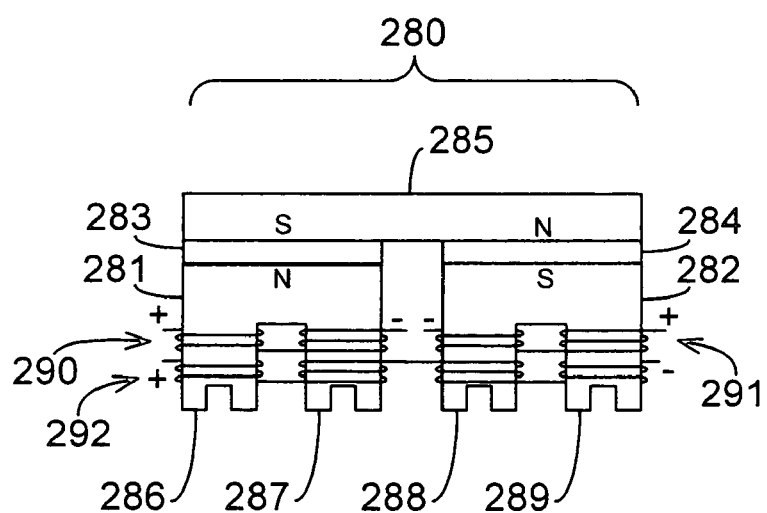

Sheet 9:
FIG. 15: Alternate winding configuration of electromagnet.
FIG. 16: Alternate electromagnet design.

Figure 17A:
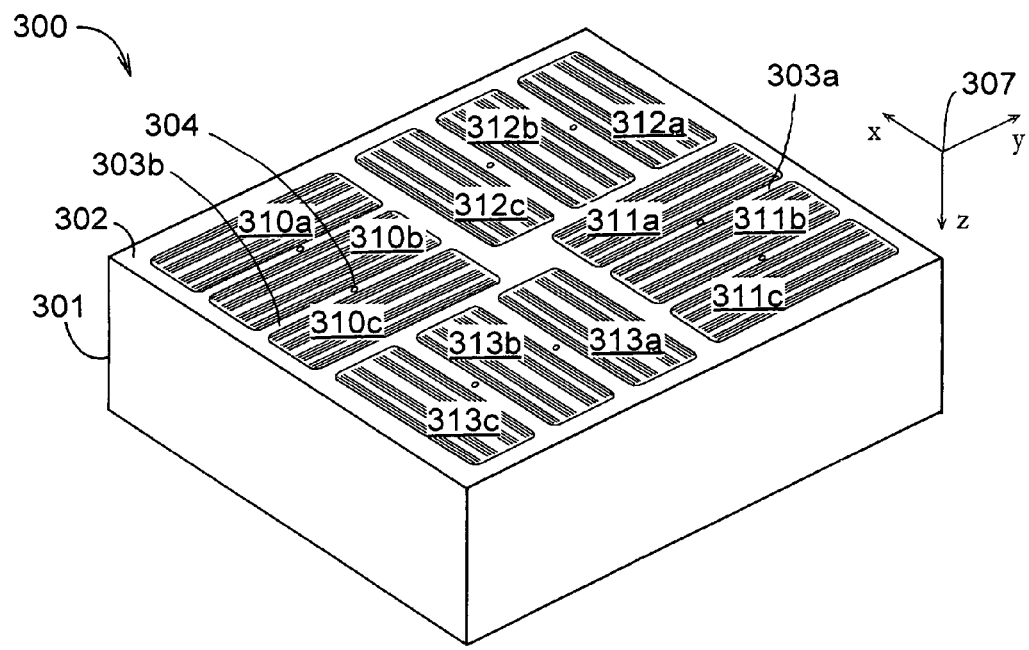

Sheet 10:

FIG. 17A: Front perspective view of planar Sawyer motor with 3/6-phase electromagnets.

Figure 17B:
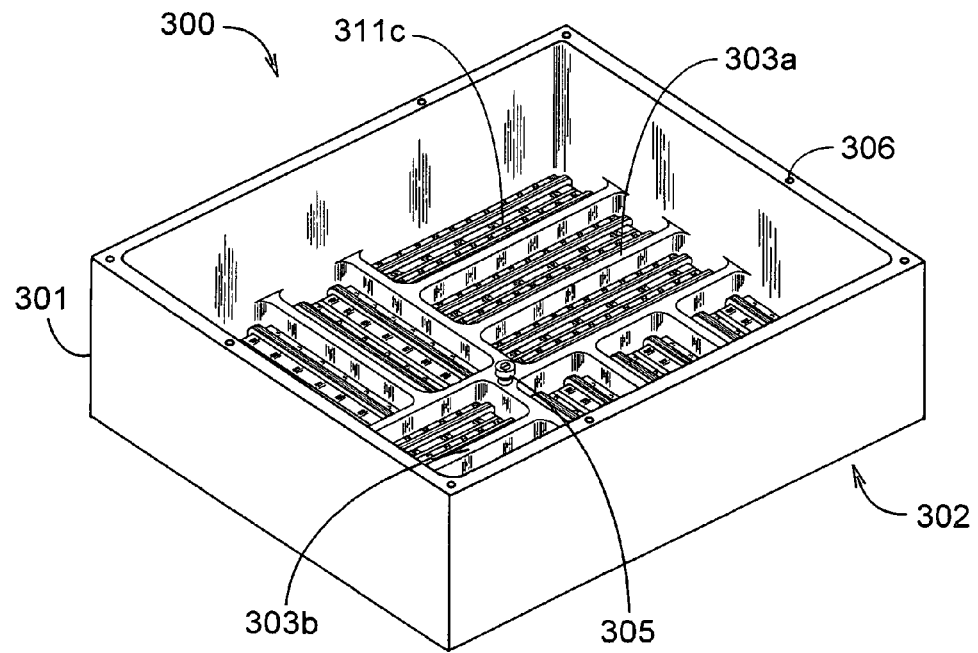

FIG. 17B: Rear perspective view of planar Sawyer motor with 3/6-phase electromagnets.

DETAILED DESCRIPTION OF PREFERRED EMBODIMENT—FIGS. 9, 10, 12

FIG. 10 shows a magnetic platen 201 provided with a pattern of grooves 202 forming a sequence of teeth 203 having a constant pitch 204. The grooves 202 and the teeth 203 are of approximately equal width. A set of three electromagnets 206, 208 and 210 are disposed apart from platen 201 by a small air gap 205. A direction of travel is indicated by arrow 241.

Electromagnet 206 has a first U-shaped magnetic core 211 spaced apart by a permanent magnet 212 from a second similar U-shaped magnetic core 213. Core 211 has a first salient toothed pole 216 spaced apart from a second salient toothed pole 217. A winding 214 is provided in the slot between salient pole 216 and salient pole 217. Core 213 has a first salient toothed pole 218 spaced apart from a second salient toothed pole 219. A winding 215 is provided in the slot between salient pole 218 and salient pole 219.

Electromagnet 208 has a first U-shaped magnetic core 221 spaced apart by a permanent magnet 222 from a second similar U-shaped magnetic core 223. Core 221 has a first salient toothed pole 226 spaced apart from a second salient toothed pole 227. A winding 224 is provided in the slot between salient pole 226 and salient pole 227. Core 223 has a first salient toothed pole 228 spaced apart from a second salient toothed pole 229. A winding 225 is provided in the slot between salient pole 228 and salient pole 229.

Electromagnet 210 has a first U-shaped magnetic core 231 spaced apart by a permanent magnet 232 from a second similar U-shaped magnetic core 233. Core 231 has a first salient toothed pole 236 spaced apart from a second salient toothed pole 237. A winding 234 is provided in the slot between salient pole 236 and salient pole 237. Core 233 has a first salient toothed pole 238 spaced apart from a second salient toothed pole 239. A winding 235 is provided in the slot between salient pole 238 and salient pole 239. The tooth pitch of salient poles 216, 217, 218, 219, 226, 227, 228, 229, 236, 237, 238 and 239 is the same as tooth pitch 204 of platen 201, and the tooth geometry is similar to that of platen 201.

Electromagnet 206 is spaced apart by a gap 207 from electromagnet 208. Electromagnet 208 is spaced apart by a gap 209 from electromagnet 210. Not shown is some necessary mechanical structure for rigidly mounting electromagnets 206, 208 and 210 to precisely maintain gaps 207 and 209 and to provide some means of maintaining gap 205. Such structures are typically machined or cast aluminum housings with pockets provided for embedding electromagnets 206, 208, and 210 using an epoxy potting compound. The housing typically provides a bearing system such as an air bearing for maintaining gap 205 to allow relative motion of electromagnets 206, 208 and 210 to platen 201 in the direction shown by arrow 241.

FIG. 12 provides a more detailed 2D view of the system of FIG. 10 using the same numbers for similar parts. Windings 214, 215, 224, 225, 234, and 235 are shown as split phase windings with four leads, a detail not shown in FIG. 10. Thus winding 214 consists of a pair of two discrete windings, 214a and 214b. Winding 215 consists of a pair of two discrete windings 215a and 215b. Winding 224 consists of a pair of two discrete windings 224a and 224b. Winding 225 consists of a pair of two discrete windings 225a and 225b. Winding 234 consists of a pair of two discrete windings 234a and 234b. Winding 235 consists of a pair of two discrete windings 235a and 235b.

The orientation of permanent magnets 212, 222, and 232 is also shown in FIG. 12 as designated by N and S marks. Permanent magnets 212 and 232 have the same orientation, while permanent magnet 222 has reversed orientation.

The relative phase of each salient pole is also more clearly visible and may be assigned a label as follows:

Electromagnet 206:
Salient pole 216: 0 degrees/phase a'
Salient pole 217: 180 degrees/phase a'
Salient pole 218: 30 degrees/phase d
Salient pole 219: 210 degrees/phase d'
Electromagnet 208:
Salient pole 226: 120 degrees/phase b
Salient pole 227: 300 degrees/phase b'
Salient pole 228: 150 degrees/phase e
Salient pole 229: 330 degrees/phase e'
Electromagnet 210:
Salient pole 236: 240 degrees/phase c
Salient pole 237: 60 degrees/phase c'
Salient pole 238: 270 degrees/phase f
Salient pole 239: 90 degrees/phase f'

The twelve individual toothed salient poles are thus seen to each have a unique phase spacing at some multiple of 30° relative to the other poles. A general equation may be written as: $P = +/- N \times 30°$, where N=0, 1, 2, 3, 4, 5, 6, 7, 8, 9, 10, or 11. However, the two salient poles on any given magnetic core must have a phase relationship of +/−180° relative to each other, that is they must be part of a phase pair. The actual ordering of the three electromagnets need not be as stated in the list above.

FIG. 9 shows a schematic diagram of electromagnets 206, 208, and 210 showing each salient pole and coil windings. A balanced three phase current source, not shown, provides current phases i, j, and k. Windings 214a, 215a, 225b, and 234b are connected to phase i. Windings 214b, 224a, 225a, and 235b are connected to phase j. Windings 215b, 224b, 234a, and 235a are connected to phase k. FIG. 9 shows all windings of a given phase as series connected which ensures equal current flow. It is also possible to parallel connect the windings of a given phase, although equal current distribution is then dependent on the magnetic properties of each electromagnet assembly. It should be noted that the correct phase polarity must be determined when connecting each winding. This depends on permanent magnet orientation and handedness of coil windings, both details not shown in FIG. 9. Reversing lead connections of a phase inverts the phase.

Operation of Preferred Embodiment—FIGS. 9, 11, 12, 13

FIG. 12 shows electromagnets 206, 208 and 210 in what may be defined as a zero offset or reference position relative to platen 201. Assume it is desired to produce force in the +x direction as indicated by arrow 241. Peak force for this condition will be developed by whichever salient pole lags platen 201 by 90 degrees. This is found to be salient pole 238 designated phase f. Given the orientation shown for permanent magnet 232, magnetic core 233 is biased at S magnetic potential while magnetic core 231 is biased to N magnetic potential. A steering mmf must be produced by the sum of windings 235a and 235b as shown by the heavy arrow in order to concentrate flux in core 233 to salient pole 238 while blocking flux in salient pole 239. The return flux path through core 231 is primarily through salient pole 236 designated phase c, which lags platen 201 by 120 degrees for the position shown. A suitable steering mmf must be produced by the sum of windings 234a and 234b as shown by a lighter arrow.

If windings 235a and 235b sum to produce a mmf which is a function of cos(p), and windings 234a and 234b sum to produce a mmf which is a function of cos(p−30) where p is position phase in degrees, then net force vs. displacement curves for phases c, c', f and f' of salient poles 236, 237, 238 and 239 will be as shown in FIG. 11. As already described for FIGS. 1–4, each salient pole produces a $\sin^2$ force function over a 180 degree interval and is zero for the remaining 180 degrees of each 360 degree tooth pitch. The sum of two salient poles 180 degrees out of phase contained on a single magnetic core such as 233 is a phased $\sin^2$ force function over the full 360 degrees. Salient poles 236 and 237 form a first pair of 180-degree poles while poles 238 and 239 form a second pair of 180-degree poles. The relative spacing of poles 236 and 237 to poles 238 and 239 is 30 degrees. Thus the force function shown in FIG. 11 is that of $\cos^2(p)$ and $\cos^2(p-30)$. The total force function of electromagnets 206, 208 and 210 combined has three similar graphs as shown in FIG. 11 having 12 peaks summing to a constant according to the following equation:

$$F_{total}=k[\cos^2(p)+\cos^2(p-30)+\cos^2(p-60)+\cos^2(p-90)+\cos^2(p-120)+\cos^2(p-150)]=3k$$

Where p=position phase in degrees and k is a constant for the force produced from each magnetic core 211, 213, 221, 223, 231, and 233. The total force is thus independent of position p.

FIG. 13 shows a vector diagram of the phases depicted in FIG. 12. Phase a is chosen as 0. Phases a, d, c', f', b, e, a', d', c, f, b', and e' are equally spaced 30 degrees apart. Each letter and its prime such as f and f' are seen to be 180 degrees apart. Each pair of 180 degree phases is more accurately considered a single phase and is always formed by two salient poles such as 238 and 239 on a single magnetic core such as 233 of FIG. 12. The system of FIGS. 10 and 12 is thus considered a true 6-phase system and the force function will consist of 12 pulses equally spaced 30 degrees apart. FIG. 13 shows the non-prime phase designations a, b, c, d, e, and f as being the actual six phases using heavy arrows. The primed phases a', b', c', d', e', and f' are shown using light arrows. FIG. 13 more clearly shows which phases of FIG. 12 produce force as needed for the position shown in FIG. 12 with phase a=0. For force in the +x direction of arrow 241 of FIG. 12 or counter clockwise rotation in FIG. 13, all phases which lag phase a between 0 and 180 degrees will produce useful force. Thus phases e', b', f, c, and d' will all produce positive force with f which lags 90 degrees producing peak force. For force in the −x direction of arrow 241 of FIG. 12 or clockwise rotation in FIG. 13, all phases which lag phase a between 0 and 180 degrees will produce useful force. Thus phases d, c', f', b, and e will all produce force with f' which lags by 90 degrees producing peak force. The vectors that lag the current zero position depends on the desired direction of travel.

Referring to FIG. 12 and considering electromagnet 210 it can be seen that magnetic path length behavior is more similar to single-phase element 28 of FIG. 3 than to two-phase element 62 of FIG. 5A. When flux is concentrated through pole 238 which is adjacent to magnet 232 it primarily returns through pole 236 which is more distant to magnet 232. Similarly, when flux is concentrated through pole 239 which is more distant to magnet 232 it will primarily return through pole 237 which is adjacent to magnet 232. The relative phase offset of core 42 from core 40 in FIG. 3 is 0 degrees which gives the best magnetic path length stability. The relative offset of core 233 to core 234 in FIG. 12 is 30 degrees, which gives good magnetic path length stability. The relative phase offset of core 65 to core 63 in FIG. 5A is 90 degrees which gives the poorest magnetic path length stability.

These are many other combinations of pole spacing that produce working 6-phase designs, but the preferred spacing is that shown in FIG. 9 and FIG. 12 or the following equivalent series which just reverses the left/right lead/lag relationship:

Electromagnet 206:
Salient pole 216: 0 degrees/phase a
Salient pole 217: 180 degrees/phase a'
Salient pole 218: 330 degrees/phase e'
Salient pole 219: 150 degrees/phase e
Electromagnet 208:
Salient pole 226: 120 degrees/phase b
Salient pole 227: 300 degrees/phase b'
Salient pole 228: 90 degrees/phase f'
Salient pole 229: 270 degrees/phase f
Electromagnet 210:
Salient pole 236: 240 degrees/phase c
Salient pole 237: 60 degrees/phase c'
Salient pole 238: 210 degrees/phase d'
Salient pole 239: 30 degrees/phase d The preferred phase spacing places a first 180° pole pair with a second 180° pole pair on each electromagnet where the first pole pair is offset +/−30° from the second pole pair. However, other combinations are also useful, such as a first pole pair offset +/−60° or +/−90°, from a second pole pair of each electromagnet. In addition, the identical electromagnets such as 206, 208, and 210 may be space apart from each other by phases such as 300 or 600 rather than 120°. An example of a phase configuration using 30° core to core spacing within the electromagnets with 60° electromagnet to electromagnet spacing is:

Electromagnet 206:
Salient pole 216: 0 degrees/phase a
Salient pole 217: 180 degrees/phase a'
Salient pole 218: 30 degrees/phase d
Salient pole 219: 210 degrees/phase d'
Electromagnet 208:
Salient pole 226: 60 degrees/phase b
Salient pole 227: 240 degrees/phase b'
Salient pole 228: 90 degrees/phase e
Salient pole 229: 270 degrees/phase e'
Electromagnet 210:
Salient pole 236: 120 degrees/phase c
Salient pole 237: 300 degrees/phase c'
Salient pole 238: 150 degrees/phase f
Salient pole 239: 330 degrees/phase f'

Another possible phase configuration using 90° core to core spacing within the electromagnets with 30° electromagnet to electromagnet spacing is:

Electromagnet 206:
Salient pole 216: 0 degrees/phase a
Salient pole 217: 180 degrees/phase a'
Salient pole 218: 90 degrees/phase d
Salient pole 219: 270 degrees/phase d'
Electromagnet 208:
Salient pole 226: 30 degrees/phase b
Salient pole 227: 210 degrees/phase b'

Salient pole 228: 120 degrees/phase e
Salient pole 229: 300 degrees/phase e'
Electromagnet 210:
Salient pole 236: 60 degrees/phase c
Salient pole 237: 240 degrees/phase c'
Salient pole 238: 150 degrees/phase f
Salient pole 239: 330 degrees/phase f'

One skilled in the art will realize that a given choice of electromagnet core to core phase as well as the choice of electromagnet to electromagnet phase will impact the overall minimum size of the forcer, since the discrete nature of the teeth impose geometrical constraints. These overall size variations are most pronounced if each pole has a single large tooth compared to poles with 4 to 6 fine teeth fine. The required thickness of permanent magnet as well as any mechanical mounting requirements must also be considered when selecting the actual spacing between cores within electromagnets as well as the spacing between electromagnets. The correct vector diagram for each specific phase configuration must be determined to correctly wind and interconnect the six individual split-phase windings.

While the above phase selections result in mechanically and electrically identical electromagnets, other variations can be specified which require different core to core phase spacing resulting in two or three different mechanical and electrical electromagnets in a forcer. Since this generally increases manufacturing cost as well as decreases system linearity, such designs should generally be avoided.

One skilled in the art will realize that a +/−120° core to core phase on a single electromagnet reduces the 6-phase design to a 3-phase design, where each electromagnet is a coupled 2-phase pair. One such phase configuration is:
Electromagnet 206:
Salient pole 216: 0 degrees/phase a
Salient pole 217: 180 degrees/phase a'
Salient pole 218: 120 degrees/phase b
Salient pole 219: 300 degrees/phase b'
Electromagnet 208:
Salient pole 226: 120 degrees/phase b
Salient pole 227: 300 degrees/phase b'
Salient pole 228: 240 degrees/phase c
Salient pole 229: 60 degrees/phase c'
Electromagnet 210:
Salient pole 236: 240 degrees/phase c
Salient pole 237: 60 degrees/phase c'
Salient pole 238: 0 degrees/phase a
Salient pole 239: 180 degrees/phase a'

Each phase winding of this configuration is a pure single-phase with each phase being distributed across two electromagnets. The motor energy efficiency is identical to a standard three-phase motor, while the linearity may be slightly improved due to the spatial distribution of force production compared to a standard three-phase motor. This configuration produces a 6-pulse force function similar to a 3-phase design.

FIG. 13 shows balanced three-phase vectors i, j, and k, offset 15 degrees from phase a to provide a means of generating a six-phase drive using standard 3-phase drive electronics. A vector 250 labeled mi is shown in the direction of i, while a second vector 251 labeled −nk is shown attached to vector 250's tip. Vectors 250 and 251 sum to produce phase d. Note that for drawing clarity, vectors 250 and 251 are shown offset from the origin and offset from phase d. Similar vectors may be chosen to construct all six phases as needed. The following equations provide the correct split phase winding turns required for the configuration shown in FIGS. 9, 12, and 13.

$$a = mi - nj$$

$$d = mi - nk$$

$$b = mj - nk$$

$$e = mj - ni$$

$$c = mk - ni$$

$$f = mk - nj$$

where m=0.8165 and n=0.2988 are scale factors applied to the total number of turns used for a 6-phase design.

An important aspect of the above equations is that each winding has identical m and n fractions of two primary phases. Thus all windings are identical for manufacturing purposes, reducing cost. To one skilled in the art, it is apparent that there are many possible winding combinations, which can produce the same net mmf starting from different phase relationships.

Since m+n=1.115 it can be seen that 11.5% more turns are required to achieve an equal number of ampere-turns for a three-phase drive as opposed to a six-phase drive. If the same number of total turns is used, split according to the ratio of m and n as given, then 11.5% more current must be supplied to generate the same motor force while the effective winding resistance would be 0.8969 of nominal. This results in a motor constant (force output/square root of watts input) of 0.897 or 11.5% worse than a six-phase drive. This is the penalty paid for achieving three-phase drive of a six-phase motor. This penalty may be somewhat offset by improving winding fill factors through the use of flat ribbon, square or hexagonal magnet wire. Power dissipation improves linearly with fill factor while motor constant improves by the square root of fill factor. The decreased motor efficiency is offset however by increased overall amplifier efficiency due to half the number of amplifiers being required for 3-phase drive vs. 6-phase drive.

Additional Embodiments—FIG. 17A, 17B

FIGS. 17A and 17B depict an additional embodiment of the present invention in which four 3/6-phase linear motor forcers such as is shown in FIG. 10 and FIG. 12 are combined to form a two-axis planar motor forcer 300. Referring to FIG. 17A, forcer 300 is provided with a rigid housing 301 typically formed from machined or cast aluminum alloy. Housing 301 is provided with a face 302 with twelve pockets disposed in face 302 suitably sized to receive a set of twelve electromagnets 310a, 310b, 310c, 311a, 311b, 311c, 312a, 312b, 312c, 313a, 313b, and 313c. The twelve electromagnets are constructed as in FIG. 10, FIG. 12, and FIG. 13 or any of the possible variations previously described. Ribs such as 303a and 303b on face 302 form the pockets. Electromagnets such as 311c are fixed within the pockets in face 302 using high-strength epoxy or potting compound to provide precise relative spacing.

A series of small orifice air-jets one of which is shown at 304 are provided in face 302. An intersecting grid of holes, not shown, within ribs such as 303b provide a means of connecting air-jets such as 304 with a common source of compressed air. Not shown is a two dimensional magnetic platen consisting of square or rectangular teeth formed on a planar surface by machining or etching two sets of orthogonal lines.

FIG. 17B shows planar motor 300 from the rear of case 301. Face 302 is not visible. Case 301 is largely hollowed out on the rear, with ribs such as 303a and 303b extending from face 302 a short distance into the interior of case 301. The rear surfaces of electromagnets such as 311c are visible within the pockets formed by the ribs such as 303a. Not shown are wire leads or a cable harness for connecting the windings of electromagnets such as 311c to some external amplifiers. A pneumatic fitting 305 is provided to couple compressed air to previously described air-jets such as 304 of FIG. 17A. A number of threaded holes, one of which is shown at 306, provide a means of attaching a cover or tooling plate, not shown, to case 301 for building machines incorporating planar motor 300.

Operation—FIGS. 17A, 17B

Electromagnets 310a, 310b and 310c are similar to electromagnets 206, 208, and 210 of FIG. 10 and FIG. 12. Case 301 provides a means of rigidly spacing electromagnets 310a, 310b, and 310c apart from each other in precise phase relationship as described for electromagnets 206, 208 and 210 of FIG. 10 and FIG. 12. Case 301 and air-jets such as 304 also provide a means of forming a very low friction air-bearing between planar motor 300 and a toothed magnetic platen, not shown.

Electromagnets 310a–c form a first linear motor capable of producing precise force acting in the x-axis direction as shown by coordinates 307 of FIG. 17A. Similarly, electromagnets 311a–c form an identical second linear motor capable of producing precise force acting in the x-axis direction of coordinates 307.

Electromagnets 312a–c form a first linear motor capable of producing precise force acting in the y-axis direction as shown by coordinates 307 of FIG. 17A. Similarly, electromagnets 313a–c form an identical second linear motor capable of producing precise force acting in the y-axis direction of coordinates 307.

Electromagnets 310a–c are offset in the y-axis direction of coordinates 307 from electromagnets 311a—c. Similarly, electromagnets 312a–c are offset in the x-axis direction of coordinates 307 from electromagnets 313a–c. This geometric relationship allows not only force production in the x-axis and y-axis directions of coordinates 307 but also a limited amount of rotation about a vector parallel to the z-axis direction as well. The rotational range is typically +/−3 degrees. Rotational torque production is only possible if the four linear motors consisting of electromagnets 310a–c, 311a–c, 312a–c and 313a–c are each independently controlled, typically from a 3-phase delta or Y-connected amplifier, not shown.

Although it is possible to control planar motor 300 with open-loop stepper-motor controllers, it is now increasingly common to further equip case 301 with some means of position detection, not shown, in order to provide highly precise closed-loop operation. Such position detection means are usually optical or magnetic sensors capable of precisely detecting position in x and y as well as rotationally about z.

Alternate Embodiments—FIGS. 14, 15, 16

Numerous variations of the above-described invention are possible to suit particular requirements that may arise. The following examples illustrate a few alternate embodiments that have merit.

FIG. 14 shows a phase vector diagram for obtaining 2-phase drive of electromagnets such as 206, 208, and 210 described in FIGS. 10 and 12. Phase vectors a, d, c', f', b, e, a', d', c, f, b' and e' are shown similarly to FIG. 13, however, they have been rotated clockwise by 15 degrees for illustration. Six vectors, a, d, f', b, e, and c, are chosen as primary phases and are illustrated with heavy lines. Two source phases, r and s, are 90 degrees apart as is typical for 2-phase drive, shown by dashed vectors. A first vector 260 is given by −pr while a second vector 261 is given by −qs. Vectors 260 and 261 sum to produce phase c from the drive phases r and s. For the vectors shown, p=q=0.7071. Equations for all phases are given as follows:

$$a=mr-ns$$

$$d=mr+ns$$

$$f'=ms+nr$$

$$b=ms-nr$$

$$e=qs-pr$$

$$c=-qs-pr$$

where m=0.9659, n=0.2588, p=0.7071, q=0.7071.

Each of the selected six phases, a, d, f', b, e, and c are thus seen to consist of a split phase winding similar to the case shown for FIG., 10, 12, and 13. However, there are two different winding ratios needed. Phases a, d, f', and b are similar, while phases e and c have a different winding ratio. Furthermore, the energy efficiency of these phases is poorer than that of FIG. 13. The principle benefit of this embodiment is for compatibility with existing 2-phase motor controllers and amplifiers. One skilled in the art will understand that there are numerous phase winding ratios that can be chosen by rotating the vectors r and s relative to phase vectors a, d, c', f', b, e, a', d', c, f, b' and e'.

FIG. 15 shows an alternate method of constructing phase windings on an electromagnet 269, which is similar to electromagnet 206 of FIG. 12. Electromagnet 269 has a first magnetic core 270 coupled to a second magnetic core 272 by a permanent magnet 271. Core 270 is provided with a first toothed pole 273 spaced apart from a second toothed pole 274 by a slot. Core 272 is provided with a first toothed pole 275 spaced apart from a second toothed pole 276 by a slot. The phase of pole 273 is 180 degrees relative to the phase of pole 274, while the phase of pole 275 is typically +/−30 degrees relative to pole 273. The phase of pole 275 is 180 degrees relative to the phase of pole 276.

As was seen from the vector equations for FIG. 13, and the split phase windings shown in FIG. 9 and FIG. 12, each pair of cores such as 211 and 213 are provided with windings such as 214a, 214b, 215a, and 215b according to the equations:

$$a=mi-nj$$

$$d=mi-nk$$

where m=0.8165 and n=0.2988

Examination of the above equation indicates that three windings could provide the necessary split phases, namely a common winding of mi, for both phase a and d, and two individual windings of nj, and nk. FIG. 15 shows a winding 277 in the slot between pole 273 and pole 274. A common winding 279 is wound to encompass poles 274 and 275. A third winding 278 is formed in the slot between pole 275 and pole 276. Winding 279 provides mi, while winding 277 provides nj and winding 278 provides nk.

Electromagnet 269 of FIG. 15 provides better control of pole reluctance variation, since winding 279 encompasses poles 274 and 275 which have short magnetic paths while independent windings 277 and 278 encompass poles 273 and 276 which have longer magnetic paths. The number of turns of winding 279 may be adjusted relative to the turns of windings 277 and 278 to compensate for reluctance variation. However, the cost of manufacturing may be somewhat higher, and the thermal performance is slightly poorer relative to electromagnet 206 of FIG. 12.

FIG. 16 shows another alternate electromagnet configuration. An electromagnet 280 has a first U-shaped magnetic core 281 magnetically coupled via a pair of permanent magnets 283 and 284, and a magnetic yoke 285 to a second U-shaped magnetic core 282. Core 281 is provided with a first salient toothed pole 286 that is spaced apart by a slot from a second salient toothed pole 287. Core 282 is provided with a first salient toothed pole 288 that is spaced apart by a slot from a second salient toothed pole 289. A winding 290 is wound on pole 286 and on pole 287. A winding 291 is wound on pole 288 and on pole 289. A common winding 292 is wound on poles 286, 287, 288, and 289. The phase relationship of poles 286, 287, 288 and 289 is the same as the phase relationship of poles 273, 274, 275, and 276 of FIG. 15.

Winding 292 provides the common mi term, while winding 290 provides nj and winding 291 provides nk. Since each pole is encompassed by winding turns exclusively for one pole, the number of turns may be adjusted to compensate for pole reluctance variation as noted for the design of FIG. 15 as well. However, the overall size of the design of FIG. 16 is larger due to windings protruding from the sides of poles 286 and 289.

The configuration of permanent magnets 283 and 284 along with magnetic yoke 285 is that of the so-called back or exterior magnet design. This well-known design does provide more equal pole reluctance values, as both poles 286 and 287 as well as poles 288 and 289 are symmetrically placed with respect to magnets 283 and 284. However, the overall size is much larger than electromagnets of FIG. 12, and the design typically has higher energy loss.

One skilled in the art will appreciate that additional combinations of the described embodiments may be useful. The exterior magnet structure of FIG. 16 may be used with the winding configurations of FIG. 12 and FIG. 15. The winding structure of FIG. 16 may also be used with the sandwich magnet structure of FIG. 12. A single permanent magnet such as 283 or 284 may be used with yoke 285 shaped to close the magnetic path as well. Various hybrid windings comprising elements shown in FIG. 12, FIG. 15, and FIG. 16 may be used to accomplish the same function.

CONCLUSION, RAMIFICATIONS, AND SCOPE

Accordingly, the reader will see that the Sawyer motor forcer of the present invention provides a number of advantages compared with existing systems:

it improves the linearity of the motor force function by providing a balanced 6-phase design, which has 50% more force pulses per tooth pitch than existing 2/4-phase designs and 100% more compared with existing 3-phase designs;

it maintains good magnetic path length stability in the electromagnets, which improves motor force linearity;

it provides a uniform electromagnet winding configuration allowing all electromagnets to be manufactured identically;

it enables 6-phase magnetic motors to be driven from standard 3-phase amplifiers and motor controllers, thus reducing the cost of controlling linear or planar motors;

it reduces the number of electromagnets required from four to three compared to the 2/4-phase designs, thus reducing costs and enabling more compact motors.

Although the descriptions above provides detailed specification of several presently preferred embodiments of this invention, these should not be construed as limiting the scope of the invention. Countless variations and permutations of winding configurations with specific magnet designs may be combined to produce alternate embodiments of this invention by one of ordinary skill in the art. Well known in the art are numerous methods for utilizing such linear motors in various mechanical frames in either single-axis systems or in dual-axis planar motor systems. Multiple single-axis motors may be combined to form multi-axis robotic or assembly machines for general purpose or specialized applications. Although such linear motors generally employ electromagnetic structures with pole faces lying in a common plane, it is possible to use cylindrical surfaces, or multiple planes such as L-shaped, U-shaped, or rectangular tube shaped platens with some of the electromagnetic poles disposed to face the various surfaces. The teeth may be formed in either of two directions on the pole surfaces of the electromagnets, which merely changes the direction of travel relative to the electromagnet structure. The specific geometry and size of teeth spacing may vary by application, from a fraction of a mm to tens of cm. Accordingly, the scope of the present invention is limited only by the appended claims.

I claim:

1. A six-phase linear motor forcer consists of:

a set of electromagnets, of substantially similar construction, comprising a first electromagnet, a second electromagnet, and a third electromagnet, said first electromagnet being displaced proximate to said second electromagnet in a first direction, said second electromagnet being displaced proximate to said third electromagnet in said first direction, said first direction defining an axis of motion, said first electromagnet, said second electromagnet, and said third electromagnet each further comprising a first magnetic core, said first magnetic core provided with a first salient pole having one or more teeth having a defined tooth pitch Tp in said first direction, a second salient pole having one or more teeth having a tooth pitch of said tooth pitch Tp in said first direction, and further including a winding slot disposed on said first magnetic core between said first salient pole and said second salient pole, said winding slot being provided with one or more coil windings for controllably altering the magnetic flux between said first salient pole and said second salient pole, the relative phase of said one or more teeth of said first salient pole to the phase of said one or more teeth of said second salient pole being approximately +/−180° of said tooth pitch Tp in said first direction, a second magnetic core, said second magnetic core provided with a first salient pole having one or more teeth having a tooth pitch of said tooth pitch Tp in said first direction, a second salient pole having one or more teeth having a tooth pitch Tp in said first direction, and further including a winding slot disposed on said second magnetic core between said first salient pole and said second salient pole, said slot being provided with one or more coil windings for controllably altering the magnetic flux between said first salient pole and said second salient pole, the relative phase of said one or more teeth of said first salient pole to the phase of said one or more teeth of said second salient pole being approximately +/−180° of said tooth pitch Tp in said first direction, said second salient pole of said first magnetic core being displaced proximate in said first direction to said first salient pole of said second magnetic core, said first magnetic core being magnetically coupled to said second magnetic core using a permanent magnet disposed between said second salient pole of said first magnetic core and said first salient pole of said second magnetic core, wherein said set of electromagnets contains a total of twelve toothed salient poles, further providing the relative phase alignment P of the teeth of any one salient pole to the teeth of the other eleven salient poles, specified in degrees of a said tooth pitch Tp in said first direction is about P=+/−N×30°, where N=1, 2, 3, 4, 5, 6, 7, 8, 9, 10, or 11, and further including a rigid housing for precisely maintaining the relative spacing of said first electromagnet, said second electromagnet, and said third electromagnet so that said set of electromagnets may be easily and reliably incorporated into linear or planar motor systems.

2. The device of claim 1 wherein said winding slot of each of the magnetic cores of each of the electromagnets is provided with a first coil winding and a second coil winding, said first coil winding being electrically independent from said second coil winding for effecting flux control in each of the magnetic cores of each of the electromagnets from the sum or difference of two external electrical sources.

3. The device of claim 2 wherein one of either said first coil winding or said second coil winding of said first magnetic core is electrically interconnected with one of either said first coil winding or said second coil winding of said second magnetic core on each of the electromagnets wherefore each of the electromagnets is provided with a first independent coil winding disposed on said first magnetic core, a second independent coil winding disposed on said second magnetic core, and a third independent coil winding disposed commonly on both said first magnetic core and said second magnetic core.

4. The device of claim 3 wherein said third independent coil winding of said first electromagnet is electrically interconnected with one of either said first independent coil winding or said second independent coil winding of said second electromagnet and is electrically interconnected with one of either said first independent coil winding or said second independent coil winding of said third electromagnet, said third independent coil winding of said second electromagnet is electrically interconnected with one of either said first independent coil winding or said second independent coil winding of said first electromagnet and is electrically interconnected with one of either said first independent coil winding or said second independent coil winding of said third electromagnet, and said third independent coil winding of said third electromagnet is electrically interconnected with one of either said first independent coil winding or said second independent coil winding of said first electromagnet and is electrically interconnected with one of either said first independent coil winding or said second independent coil winding of said second electromagnet, wherefore said set of electromagnets is provided with a total of three electrically independent windings or phases to effect flux control of said set of electromagnets from an external three-phase electrical source.

5. The device of claim 4 wherein the relative phase alignment of said one or more teeth of said first salient pole of said first magnetic core to said one or more teeth of said first salient pole of said second magnetic core is approximately +/−30° for each of said first electromagnet, said second electromagnet, and said third electromagnet.

6. The device of claim 5 wherein said third independent coil winding on said first electromagnet is comprised of a single common winding disposed in said winding slot of said first magnetic core and said winding slot of said second magnetic core of said first electromagnet, said third independent coil winding on said second electromagnet is comprised of a single common winding disposed in said winding slot of said first magnetic core and said winding slot of said second magnetic core of said second electromagnet, and said third independent coil winding on said third electromagnet is comprised of a single common winding disposed in said winding slot of said first magnetic core and said winding slot of said second magnetic core of said third electromagnet.

7. The device of claim 4 wherein the relative phase alignment of said one or more teeth of said first salient pole of said first magnetic core to said one or more teeth of said first salient pole of said second magnetic core is approximately +/−60° for each of said first electromagnet, said second electromagnet, and said third electromagnet.

8. The device of claim 4 wherein the relative phase alignment of said one or more teeth of said first salient pole of said first magnetic core to said one or more teeth of said first salient pole of said second magnetic core is approximately +/−90° for each of said first electromagnet, said second electromagnet, and said third electromagnet.

* * * * *